(12) United States Patent
Gutfreund et al.

(10) Patent No.: US 11,663,443 B2
(45) Date of Patent: May 30, 2023

(54) RESTRUCTURING DEEP NEURAL NETWORKS TO REDUCE THE NUMBER OF PARAMETERS

(71) Applicant: International Business Machines Corporation, Armonk, NY (US)

(72) Inventors: Dan Gutfreund, Newton, MA (US); Quanfu Fan, Somerville, MA (US); Abhijit S. Mudigonda, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 934 days.

(21) Appl. No.: 16/198,343

(22) Filed: Nov. 21, 2018

(65) Prior Publication Data
US 2020/0160144 A1 May 21, 2020

(51) Int. Cl.
*G06N 3/04* (2023.01)
*G06N 3/08* (2023.01)

(52) U.S. Cl.
CPC ............... *G06N 3/04* (2013.01); *G06N 3/08* (2013.01)

(58) Field of Classification Search
CPC .......... G06N 3/04; G06N 3/08; G06N 3/0454; G06N 3/063; G06N 20/00; G06N 3/082;
(Continued)

(56) References Cited

U.S. PATENT DOCUMENTS 8,631,044 B2 * 1/2014 Jebara ................... G06Q 30/02
707/798
2017/0337465 A1 11/2017 Sozubek et al.
(Continued)

FOREIGN PATENT DOCUMENTS

EP 3367310 A1 * 8/2018
WO 2018053835 A1 3/2018

OTHER PUBLICATIONS

Prabhu A. et al. Deep Expander Networks: Efficient Deep Networks from Graph Theory (Nov. 23, 2017) (Year: 2017).*
(Continued)

*Primary Examiner* — Kamran Afshar
*Assistant Examiner* — Ryan C Vaughn
(74) *Attorney, Agent, or Firm* — Amin, Turocy & Watson, LLP

(57) ABSTRACT

Techniques are described for reducing the number of parameters of a deep neural network model. According to one or more embodiments, a device can comprise a memory that stores computer executable components and a processor that executes the computer executable components stored in the memory. The computer executable components can comprise a structure extraction component that determines a number of input nodes associated with a fully connected layer of a deep neural network model. The computer executable components can further comprise a transformation component that replaces the fully connected layer with a number of sparsely connected sublayers, wherein the sparsely connected sublayers have fewer connections than the fully connecter layer, and wherein the number of sparsely connected sublayers is determined based on a defined decrease to the number of input nodes.

20 Claims, 9 Drawing Sheets

(58) Field of Classification Search
CPC ........ G06N 3/084; H04N 19/00; G06F 30/27; G06F 2207/4824; H03M 7/702; G06T 2207/20084
See application file for complete search history.

(56) References Cited

U.S. PATENT DOCUMENTS

| | | | |
|---|---|---|---|
| 2018/0137406 A1 | 5/2018 | Howard et al. | |
| 2018/0157969 A1 | 6/2018 | Xie et al. | |
| 2018/0336452 A1* | 11/2018 | Tschernezki | G06N 3/0454 |
| 2019/0188567 A1* | 6/2019 | Yao | G06N 3/04 |
| 2019/0295261 A1* | 9/2019 | Kang | G06N 3/0481 |

OTHER PUBLICATIONS

Hoory et al. Expander graphs and their applications (Oct. 2006) (Year: 2006).*

Sipser, M. Chapter 8, Introduction to the Theory of Computation, 3rd Ed. © 2012 (Year: 2012).*

Kaastra et al. Designing a neural network for forecasting financial and economic time series (Mar. 23, 1995) (Year: 1995).*

Cheng, et al., "An Exploration of Parameter Redundancy in Deep Networks with Circulant Projections," arXiv:1502.03436v2 [cs.CV] Oct. 27, 2015, 9 pages.

Chen, et al., "Compressing Convolutional Neural Networks," arXiv:1506.04449v1 [cs.LG] Jun. 14, 2015, 9 pages.

Chen, et al., "Compressing Neural Networks with the Hashing Trick," Proceedings of the 32 nd International Conference on Machine Learning, Lille, France, 2015. JMLR: W&CP vol. 37. Copyright 2015 by the author(s), 10 pages.

Srinivas, et al., "Data-free Parameter Pruning for Deep Neural Networks," arXiv:1507.06149v1 [cs.CV] Jul. 22, 2015, 12 pages.

Hoory, et al., "Expander Graphs and Their Applications," Bulletin (New Series) of the American Mathematical Society vol. 43, No. 4, Oct. 2006, pp. 439-561 S 0273-0979(06)01126-8 Article electronically published on Aug. 7, 2006.

Sindhwani, et al., "Structured Transforms for Small-Footprint Deep Learning," arXiv:1510.01722v1 [ stat.ML] Oct. 6, 2015, 9 pages.

Yang, et al., "Deep Fried Convnets," 2015 IEEE International Conference on Computer Vision, 8 pages.

* cited by examiner

RESTRUCTURING DEEP NEURAL NETWORKS TO REDUCE THE NUMBER OF PARAMETERS

TECHNICAL FIELD

This application relates to techniques for restructuring deep neural networks to significantly reduce the number of parameters.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that provide techniques for restructuring deep neural networks to significantly reduce the number of parameters.

According to one or more embodiments, a device is described that can comprise a memory that stores computer executable components and a processor that executes the computer executable components stored in the memory. The computer executable components can comprise a structure extraction component that determines a number of input nodes associated with a fully connected layer of a deep neural network model. The computer executable components can further comprise a transformation component that replaces the fully connected layer with a number of sparsely connected sublayers, wherein the sparsely connected sublayers have fewer connections than the fully connecter layer, and wherein the number of sparsely connected sublayers is determined based on a defined decrease to the number of input nodes. In one or more implementations, the defined decrease is based on a logarithm of the number of input nodes.

In various embodiments, the connections between the sparsely connected sublayers are determined based on an expander graph. The expander graph can connect respective input nodes of the sparsely connected sublayers with a fixed number of output nodes. The fixed number of output nodes can be independent of the number of input nodes and/or a number of output nodes of the fully connected layer. In some implementations, the fixed number of output nodes is greater than or equal to four.

With the disclosed system, based on replacement of the fully connected layer with the number of sparsely connected sublayers, a total number of parameters associated with the fully connected layer is reduced. For example, the total number of parameters associated with the fully connected layer is the product of a number of input nodes and a number of output nodes of the fully connected layer. Based on replacement of the fully connected layer with two or more sparsely connected sublayers, in some implementations, the total number of parameters can be reduced to a value corresponding to the square root of the total number of parameters. In addition, based on replacement of the fully connected layer with the number of sparsely connected sublayers, a total processing time associated with executing the fully connected layer is reduced. Furthermore, based on replacement of the fully connected layer with the number of sparsely connected sublayers, an amount of memory storage associated with storing the deep neural network model is reduced.

In some embodiments, elements described in connection with the disclosed systems can be embodied in different forms such as a computer-implemented method, a computer program product, or another form.

DETAILED DESCRIPTION

Figure 1:
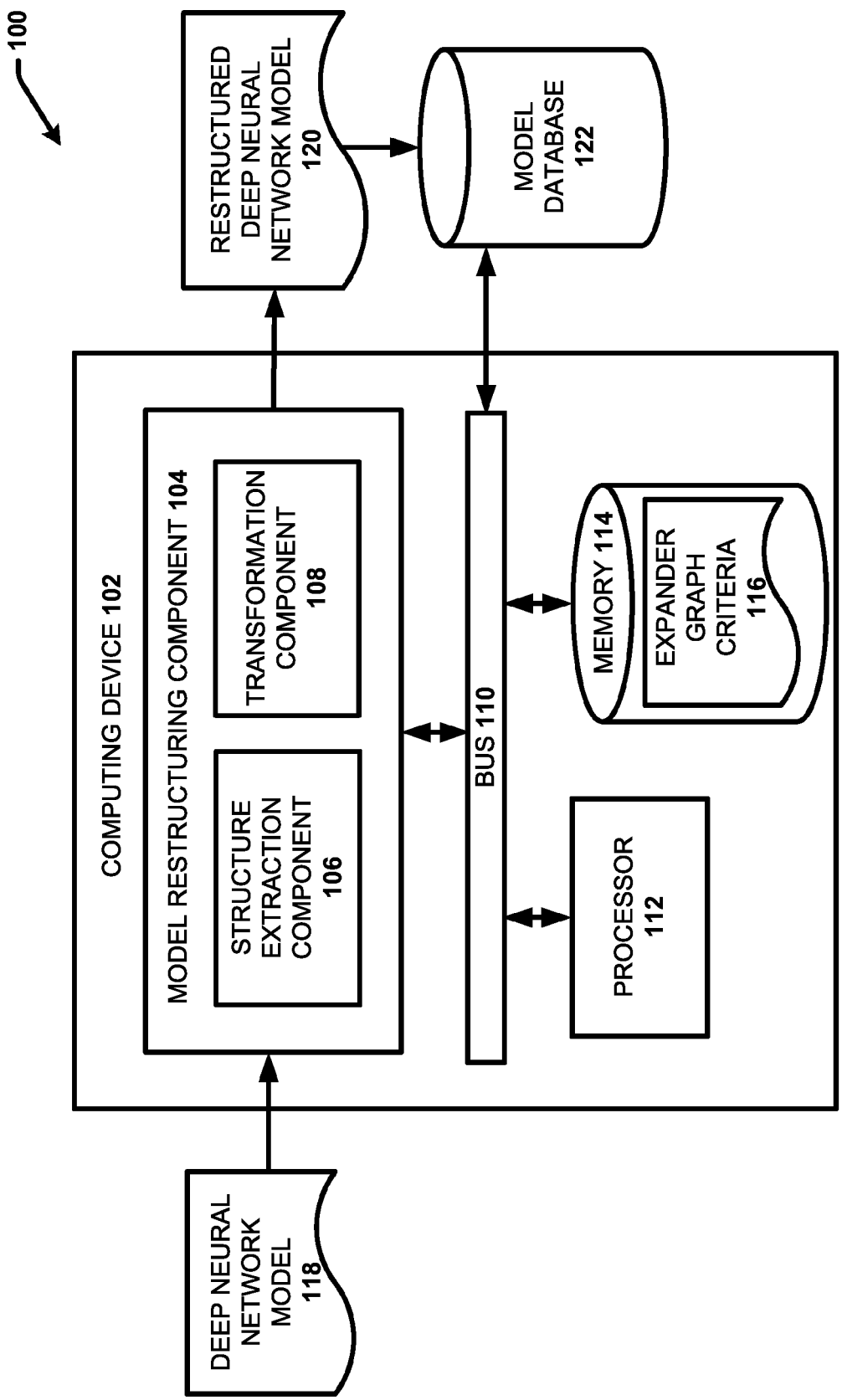
FIG. 1 illustrates a block diagram of an example, non-limiting system that facilitates reducing the number of parameters of a deep neural network model in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

Deep neural networks have recently shown impressive performance, sometimes exceeding humans, in various artificial intelligence (AI) domains, including computer vision, speech, natural language processing and more. These achievements were made possible by significant improvement in computation power as well as the availability of massive scale annotated datasets, which in turn allowed training of complex networks defined by millions of parameters. However, this came at a price. First, these large networks are often not practical, as their memory requirements make them impossible to run on mobile devices. Second, running these complex deep neural networks requires a significant amount of computation time and processing power. In addition, training them on large scale datasets may take weeks, which in turn slows down research and development. Finally, they require huge amounts of annotated training data which is often not available or expensive to obtain. Therefore, it is critical to design deep neural networks that have significantly less parameters while maintaining high levels of performance.

The subject disclosure provides systems, computer-implemented methods, apparatus and/or computer program products for restructuring deep neural networks to significantly reduce the number of parameters. The disclosed techniques for restructuring deep neural networks address a specific type of layer referred to as a fully connected layer. Fully connected layers are intermediary layers in which all outputs of neurons or nodes of an immediately upstream layer are fed as inputs to each neuron of the fully connected layer, and all outputs of each neuron of the fully connected layer are fed as inputs to each neuron of the next layer immediately downstream of the fully connected layer. Accordingly, fully connected layers have dense connections to upstream and downstream layers, resulting in a compounded number (e.g., a matrix multiplication) of input and output nodes associated with each fully connected layer. As larger neural networks are developed, with more fully connected layers and more nodes in each layer, the number of parameters can grow to the billions. Thus, techniques for reducing their storage and computation costs becomes critical to meet the requirements of practical applications.

In accordance with one or more embodiments, the disclosed techniques provide a general transformation that can be applied to any fully connected layer of a deep neural network to significantly reduce the number of parameters without hurting the overall network performance. This maintenance of performance accuracy is substantiated by graph theory. In particular, the transformation involves replacing the dense, fully connected layer with two or more sparsely connected sublayers, wherein the total number of connections between the respective sublayers is significantly less than the total number of connections between the fully connected layer and the layers immediately upstream and/or downstream of the fully connected layer. In one or more embodiments, the number of interconnected sublayers is based on a defined decrease to the number of input nodes of the fully connected layer. The sparse connections between the respective sublayers however is independent of the number of input nodes and output nodes of the fully connected layer. In particular, the sparse connections between the respective sublayers is based on a specific connection structure taken from graph theory known as an expander graph. In this regard, even though a single fully connected layer is replaced with a plurality of sublayers, based on application of an expander graph connectivity structure to the respective sublayers, the connections between each sublayer are restricted and structured in such a way such that the vast majority of parameters are reused.

With the disclosed deep neural network restructuring techniques, the number of parameters as well as running/computation time of each replaced fully connected layer is significantly reduced. For example, in some implementations, the total number of parameters and associated runtime of the fully connected layer can be reduced to a value corresponding to the square root of the total number of parameters. Based on this significant decrease to the number of parameters employed by the deep neural network model, the amount of memory storage required for storing the model is also significantly reduced. The disclosed transformation can further be easily and efficiently applied to any existing deep neural network model using existing computer architectures and packages for sparse matrix-vector multiplication. In addition, the new sublayers of the neural network models can be trained on top of pre-trained convolutional layers and/or other layers of the network, without the need to retrain the latter, and with significantly fewer annotated training data.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates reducing the number of parameters of a deep neural network model in accordance with one or more embodiments of the disclosed subject matter. System 100 and other systems detailed herein can provide substantial technical improvements in association with developing and applying deep neural networks in various domains. System 100 provides a new approach for significantly reducing the number of parameters associated with a deep neural network model while maintaining prediction accuracy of the model. The techniques provided by system 100 involve replacing one or more fully connected layers of the neural network model with a plurality of sparely connected sublayers, wherein the connectivity between the sublayers is based on expander graph theory.

Based on the significant reduction in parameters, the computation/processing time of each replaced fully connected layer is significantly reduced (e.g., as a function of a value corresponding to the square root of the number of input nodes to the fully connected layer), thereby significantly reducing the total processing time required for running/executing the model. In addition, the amount of memory storage required for storing the model is also significantly reduced, which is crucial for computer processing units (CPUs) or embedded systems with low-memory footprints (e.g., mobile devices). These reductions to the processing time and memory storage requirements are particularly important for modern deep convolutional neural network architectures where fully connected layers typically contain over 90% of the network parameters. Further, unlike competing techniques which involve complex restructuring of deep neural network models to reduce model parameters, the disclosed transformation can be easily and efficiently applied to any existing deep neural network model using existing computer architectures and packages for sparse matrix-vector multiplication. In addition, the new sublayers of the neural network models can be trained on top of pre-trained convolutional layers and/or other layers of the network, without the need to retrain the latter, thereby enabling efficient model training, development and optimization.

Embodiments of systems described herein can include one or more machine-executable components embodied within one or more machines (e.g., embodied in one or more computer readable storage media associated with one or more machines). Such components, when executed by the one or more machines (e.g., processors, computers, computing devices, virtual machines, etc.) can cause the one or more machines to perform the operations described. For example, in the embodiment shown, system 100 includes a computing device 102 that includes a model restructuring component 104. The model restructuring component 104 further includes structure extraction component 106 and transformation component 108. In this regard, the model restructuring component 104, the structure extraction component 106 and the transformation component 108 can respectively correspond to machine-executable components. System 100 also includes various electronic data sources and data structures comprising information that can be read by, used by and/or generated by the model restructuring component 104. For example, these data sources and data structures can include but are not limited to, a deep neural network model 118, a reconstructed deep neural network model 120, a model database 122 and expander graph criteria 116.

The computing device 102 can further include or be operatively coupled to at least one memory 114 and at least one processor 112. In various embodiments, the at least one memory 114 can store executable instructions (e.g., the model restructuring component 104, the structure extraction component 106 and the transformation component 108) that when executed by the at least one processor 112, facilitate performance of operations defined by the executable instruction. In the embodiment shown, the memory 114 can further store the expander graph criteria 116 that can be used by model restructuring component 104. In some embodiments, the memory 114 can also store the various data sources and/or structures of system 100 (e.g., the deep neural network model 118, the reconstructed deep neural network model 120, and/or the model database 122). In other embodiments, the various data sources and structures of system 100 can be stored in at least one other memory at one or more remote device or systems that are accessible to the computing device 102 (e.g., via one or more networks). The computing device 102 can further include a device bus 110 that communicatively couples the various components and data sources of the computing device 102. Examples of said processor 112 and memory 114, as well as other suitable computer or computing-based elements, can be found with reference to FIG. 9, and can be used in connection with implementing one or more of the systems or components shown and described in connection with FIG. 1 or other figures disclosed herein.

In some implementations, the computing device 102, and/or the various components and data sources of system 100 can be communicatively connected via one or more networks. For example, using one or more networks, the computing device 102 can communicate with one or more external devices/systems including deep neural network models (e.g., deep neural network model 118) that can be restructured by the model restructuring component 104, one or more external devices/systems including expander graph criteria 116 that can be used to restructure one or more fully connected layers of a deep neural network model, one or more external devices/systems to which reconstructed deep neural network models (e.g., reconstructed deep neural network model 120) can be provided, one or more external devices/systems including the model database 122 (wherein reconstructed models can be collated and stored), etc. Such networks can include wired and wireless networks, including but not limited to, a cellular network, a wide area network (WAD, e.g., the Internet) or a local area network (LAN). Such networks can use virtually any desired wired or wireless technology, including but not limited to: wireless fidelity (Wi-Fi®), global system for mobile communications (GSM), universal mobile telecommunications system (UMTS), worldwide interoperability for microwave access (WiMAX®), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. The computing device 102 can thus include hardware (e.g., a central processing unit (CPU), a transceiver, a decoder), software (e.g., a set of threads, a set of processes, software in execution) or a combination of hardware and software that facilitates communicating information between the computing device 102 and externals systems, sources and devices.

In the embodiment shown, the computing device 102 can receive (or otherwise access) a deep neural network model 118 having one or more fully connected layers. The model restructuring component 104 can further process the deep neural network model 118 to transform it into a reconstructed deep neural network model 120 that has fewer parameters than the deep neural network model. In some implementations, the reconstructed deep neural network model 120 can be stored in a model database 122 for subsequent training, updating and application. In other implementations, the reconstructed deep neural network model 120 (and/or the model database 122) can be stored in memory 114.

Various embodiments of the disclosed subject matter involve the restructuring of deep neural networks, which typically employ at least one fully connected layer. For example, typical deep neural network model architectures have at least one fully connected layer that feeds into a classification layer. Some deep neural network architectures, such as convolutional neural networks (CNNs), very deep neural networks, and the like, have many fully connected layers. However, the model restructuring component 104 can facilitate transforming virtually any neural network model including at least one fully connected layer into a restructured neural network model that provides the same prediction function with the same or substantially the same prediction accuracy yet using fewer parameters. In this regard, the architecture or structure of the deep neural network model 118 can vary. Further, in some implementations, the disclosed techniques for replacing fully connected layers with a plurality of sparsely connected layers can be applied to other, non-fully connected layers of the neural network to reduce the total number of parameters associated therewith.

Fully connected layers are typically the top or last layers of deep neural networks before the final output/classification layer, often referred to as the softmax. One or more such fully connected layers attach weights to the features computed by the preceding convolutional and pooling layers and transfer the weighted features to the classification layer (typically softmax). The intuition is that the information that each feature holds about the raw input is being transferred to every output in the classification layer. For example, with image classification deep neural network models, the output that corresponds to the class "&table8" in the visual object recognition task, receives all the low-level features about the image and thus can make an accurate prediction about the likelihood that "&table8" is indeed the object in the input image. In this regard, fully connected layers directly connect every low-level feature to every output.

Figure 2:
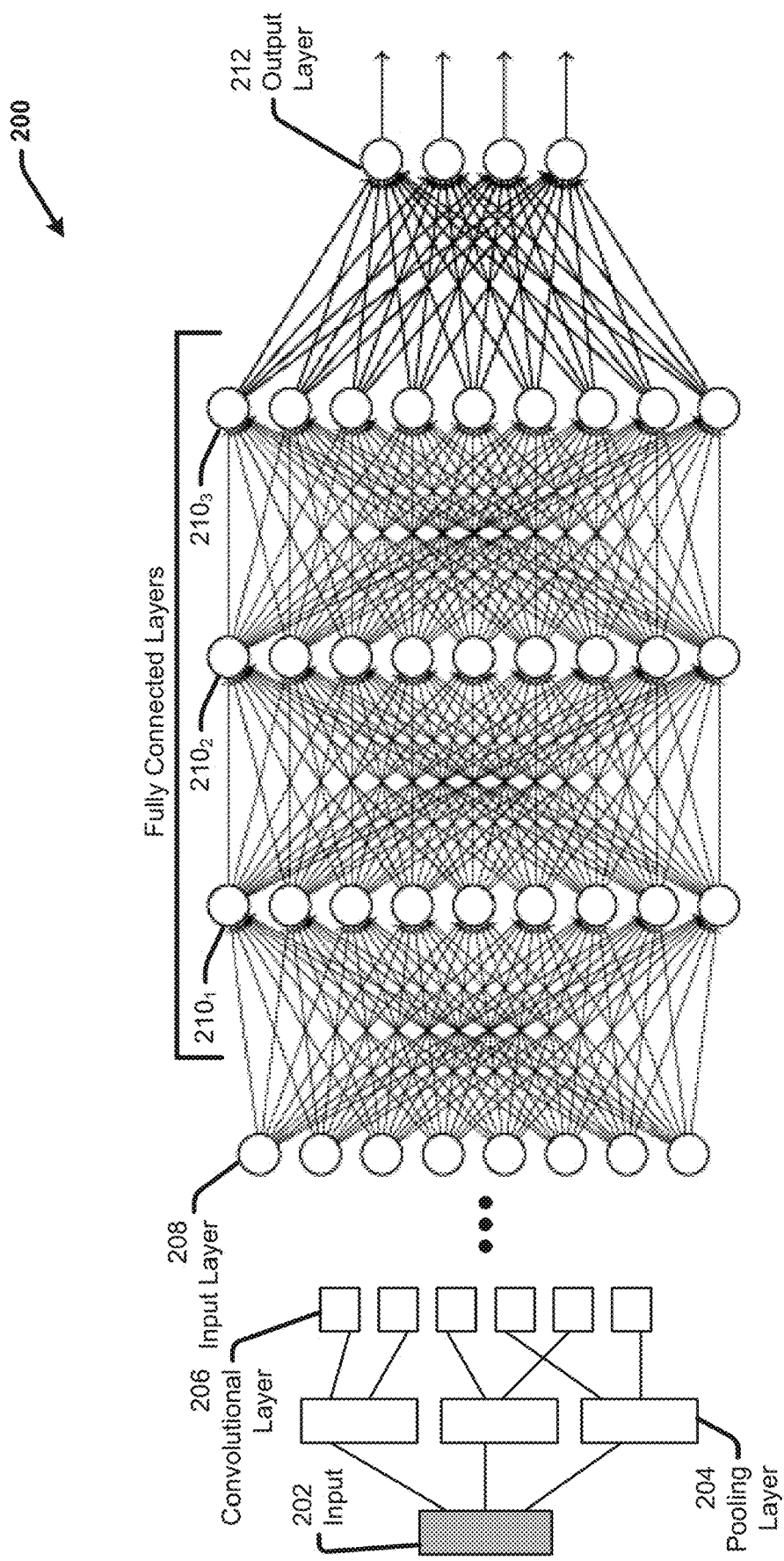
FIG. 2 presents an example illustration of the structure of a deep neural network model in accordance with one or more embodiments of the disclosed subject matter.

For example, FIG. 2 presents an example illustration of the structure of a deep neural network model 200 in accordance with one or more embodiments of the disclosed subject matter. In the embodiment shown, the deep neural network model includes the initial input 202, which could be for example, an image if the deep neural network model was an image classification model. The deep neural network model 200 further includes one or more pooling layers 204, followed by one or more convolutional layers 206, which connect to an input layer 208 of the fully connected layers 210. The deep neural network model 200 further includes a plurality of fully connected layers 210, followed by a final classification or output layer 212. In the embodiment shown, the deep neural network model 200 includes three fully connected layers, respectively identified as fully connected layer $210_1$, fully connected layer $210_2$, and fully connected layer $210_3$. Although three fully connected layers are shown, it should be appreciated that the number of fully connected layers included in the neural network model can vary. In this regard, the neural network models evaluated herein can include any number K of fully connected layers, wherein K comprises an integer greater than or equal to 1.0.

The number of parameters of a fully connected layer is the product of the number of inputs nodes "n" from which parameters are received and the number of output nodes "m" of the layer that produce the output parameters of the layer. In this regard, the number of parameters P associated with a fully connected layer is equal to "n" times "m", or P=nm. Thus, fully connected layers contain many more parameters than other layers of the neural network model such as convolutional and pooling layers. For example, as shown in FIG. 2, each node (also referred to as a neuron or unit) of a fully connected layer is represented by a circle, and each connection (or edge) is represented by a line. Each node of the fully connected layers is respectively connected to every single node in the immediate upstream and immediate downstream layer. For example, in the embodiment shown, each fully connected layer 210 has 9 nodes. Thus, with respect to fully connected layer $210_2$, it receives 9×9 or 81 inputs from the 9 input nodes (e.g., n=9) of fully connected layer $210_1$, and generates 9×9 or 81 outputs by the respective 9 nodes (e.g., m=9) of fully connected 210 for provision to fully connected layer $210_3$. With this example, the total number of parameters associated with the fully connected layer $210_2$ for forward computation or backward computation is thus 9×9=81. In Big O notation, the number of parameters associated a fully connected layer can be represented as O(mn). In this regard, the total number of parameters and associated computation/processing time for forward or backward computation of a fully connected layer is O(mn).

With reference to FIG. 1 in view of FIG. 2, the model restructuring component 104 can reduce the number of connections between fully connected layers (e.g., the 81 lines drawn between respective fully connected layers 210 show in FIG. 2) by replacing the densely connected layers with two or more sparsely connected sublayers while preserving the same level of information flow from the low level features to the outputs. In order to reduce the number of parameters associated with a fully connected layer while increasing the total number of number of layers, system 100 exploits the special properties of expander graphs. Expander graphs have the property that a relatively short random walk on them will land on any node in the graph with the same probability. The rate at which a random walk on a graph converges to the uniform distribution is a measure to how well information flows in the graph. Remarkably, there are expander graphs of any size in which every node is connected to only 4 other nodes and yet random walks converge to the uniform distribution after only O(log n) steps (where n is the number of nodes).

In this regard, the connections between nodes in expander graphs are sparse as the majority of all possible connections are removed. As applied to connections between nodes of neural network layers, the reduction in number of connections equates to a reduction in the number of parameters associated with a particular layer. However, even though expander graphs are sparse, from an information flow point of view, they still preserve the properties of fully connected layers through the use of interconnected sublayers that are structured in such a way that a vast majority of the parameters are reused. On the contrary, merely removing some of connections between fully connected layers 210 and/or removing nodes results in a loss of the properties of fully connected layers and therefore a loss in accuracy of the final output.

In one or more embodiments, the structure extraction component 106 can evaluate the structure of the deep neural network model 118 to identify the fully connected layer or layers thereof (e.g., fully connected layers 210). For each (or in some implementations one or more) fully connected layer of the deep neural network model 118, the structure extraction component 106 determines a number of input nodes "n" associated with the fully connected layer. The transformation component 108 can further replace the fully connected layer with two or more interconnected sublayers. In accordance with various embodiments, the transformation component 108 can determine the number of interconnected sublayers based on a defined decrease to the number of input nodes. In one more implementations, the defined decrease is based on a logarithm of the number of input nodes. For example, in various embodiments, the transformation component 108 can assume n>m, and replace the fully connected layer with O(log n) sublayers. This will reduce both the number of parameters and computation time from O(nm) to O(n log n). In this regard, in scenarios in which n=m or n and m are substantially the same, by replacing the fully connected layer with O(log n) sublayers, the decrease in parameters and associated computation time essentially corresponds to a decreased amount that is the square root O(nm).

In association with replacing the fully connected layer with two or more sublayers (wherein the number of sublayers is determined based on the value of log n), the transformation component 108 can determine and apply a connectivity structure between the respective sublayers based on the connectivity of an expander graph. For example, in the embodiment shown, the connectivity between the respective sublayers can be defined or based on expander graph criteria 116 stored in memory 114. In this regard, the expander graph criteria can control the number of connections between respective nodes of the sublayers as a function of an expander graph. In various embodiments, the expander graph criteria can set a fixed or constant number of outputs allotted for each node of the sublayers. In this regard, in accordance with the expander graph criteria 116, the connectivity between respective nodes of the sublayers can be defined such that each input node connects to a same, fixed number of output nodes. This fixed number of connections (e.g., fixed number of output nodes each input node can connect with) is independent of the number of input nodes (n) and output nodes (m) of the fully connected layer. However, in various embodiments, in order to reduce the number of connections associated with the fully connected layer, the fixed number of output nodes each sublayer input node can connect with can always be less than the number of input nodes or output nodes associated with the fully connected layer. In various embodiments, the fixed or constant number of connections can be greater than or equal to 4.0. In some implementations, the transformation component 108 can apply the same fixed or constant number of sublayer connections to various neural network models.

In one or more embodiments, the expander graph criteria 116 can also define or control the nodes included in each sublayer. For example, in some implementations, the nodes included in each sublayer can be the same as the nodes included in the fully connected layer. In this regard, each sublayer can comprise the same set of nodes as the fully connected layer. For example, with reference to fully connected layer $210_1$ which includes 9 nodes, each sublayer that replaces the fully connected layer $210_1$ can include the same 9 nodes. In this regard, each sublayer will be a mirror image of the fully connected layer, yet the connections between respective nodes of the respective sublayers will be sparse and based on the fixed or constant number of connections defined by the expander graph structure of the expander graph criteria 116.

In accordance with system 100, based on replacement of the one or more fully connected layers of the deep neural network model 118 with a set or group (including two or more) sublayers having the connectivity structure defined by the expander graph criteria 116, the deep neural network model 118 is transformed into a reconstructed deep neural network model 120. In various embodiments, the reconstructed deep neural network models can be stored in a model database 122 for subsequent training, updating and optimization.

With the disclosed transformation techniques, the number of parameters as well as the runtime associated with execution a transformed fully connected layer is reduced from O(mn) to O(n log n). At the same time, the information flow from inputs to outputs is maintained and the overall performance of the network is not reduced. Accordingly, as all or even some of the fully connected layers of a deep neural network are replaced with the disclosed sparsely connected architecture, the total number of parameters and corresponding computation time required for executing the reconstructed deep neural network model 120 relative to the deep neural network model 118 is significantly reduced. Based on this significant decrease of the number of parameters employed by the reconstructed deep neural network model 120, the amount of memory storage required for storing the reconstructed deep neural network model 120 is also significantly reduced, thereby allowing some models to be stored and executed by mobile devices. In addition, the transformation component 108 can efficiently and easily (with few computational hurdles) transform fully connected layers of deep neural network models into sparsely connected sublayers using existing computer architectures and packages for sparse matrix-vector multiplication.

Figure 3:
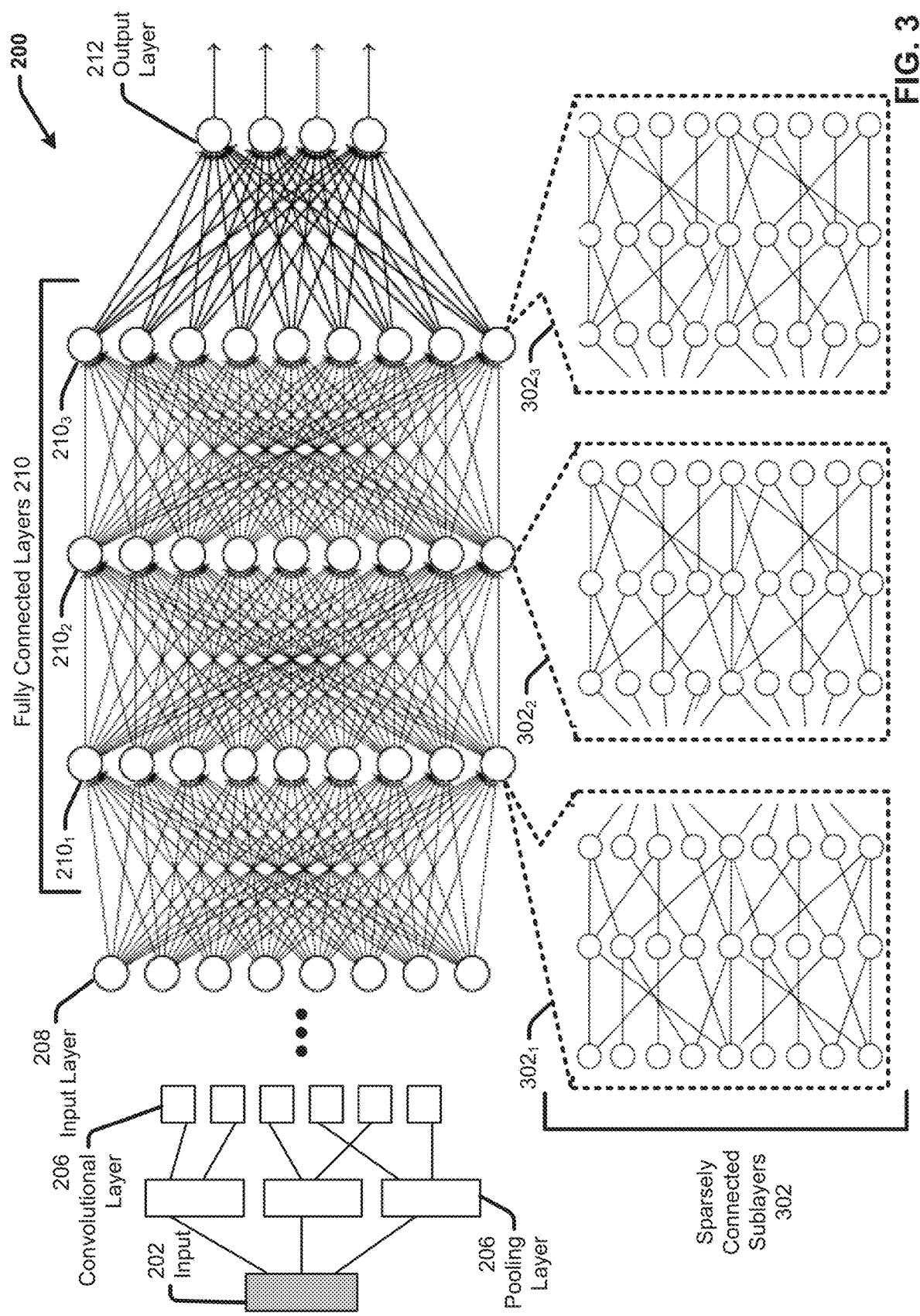
FIG. 3 presents a diagram illustrating an example transformation of the fully connected layers of a deep neural network model in accordance with one or more embodiments of the disclosed subject matter.

FIG. 3 presents a diagram illustrating an example transformation of the fully connected layers 210 of deep neural network model 200 in accordance with one or more embodiments of the disclosed subject matter. In the embodiment shown, each of the fully connected layers 210 (e.g., fully connected layer $210_1$, fully connected layer $210_2$, and fully connected layer $210_3$) can be replaced (e.g., by the transformation component 108) with a set or group of sparsely connected sublayers 302 (e.g., sublayer layer $302_1$, sublayer $302_2$, and sublayer $302_3$). In this regard, the respective sublayers included in each group of sparsely connected sublayers 302 are referred to as sparsely connected because each node of one layer is not connected to every node of neighboring layer (e.g., the layer immediately upstream or downstream therefrom). On the contrary, each node in one sublayer is connected to a fixed or constant number (e.g., the same number) of nodes in the neighboring sublayer, wherein the fixed or constant number of nodes is less than the number of input nodes or output nodes associated with the corresponding fully connected layer.

In the embodiment shown, the lines drawn between the nodes of the respective sparsely connected sublayers 302 shown in FIG. 3 are merely exemplary and are not drawn to scale and may not accurately reflect the actual number of connections between the respective nodes of the sublayers. The connection lines shown are merely provided to demonstrate the reduction in number of connection lines between the sparsely connected sublayers 302 relative to the connection lines between respective fully connected layers 210. In addition, although each group of sparsely connected layers shown in FIG. 3 includes three sublayers, the number of layers shown in this illustration is merely exemplary. In this regard, it should be appreciated that the number of sparsely connected sublayers 302 used to replace a single, fully connected layer 210 can be greater than or equal to 2 and determined based on O(log n), wherein n is the number of input nodes of the fully connected layer. Further, the number of nodes included in each sublayer shown is merely exemplary. In this regard, the number of nodes included in each sublayer can vary. For example, in some implementations, each sublayer can be a copy (including the same nodes) of the fully connected layer. In other implementations, each sublayer can comprise a different subset of the nodes of the of the corresponding fully connected layer. Furthermore, although in the embodiment shown each fully connected layer 210 of deep neural network model 200 is replaced, it should be appreciated that this depiction is merely exemplary. In this regard, some or all of the fully connected layers can be replaced with sparsely connected layers to achieve a reduction in total model parameters.

Figure 4:
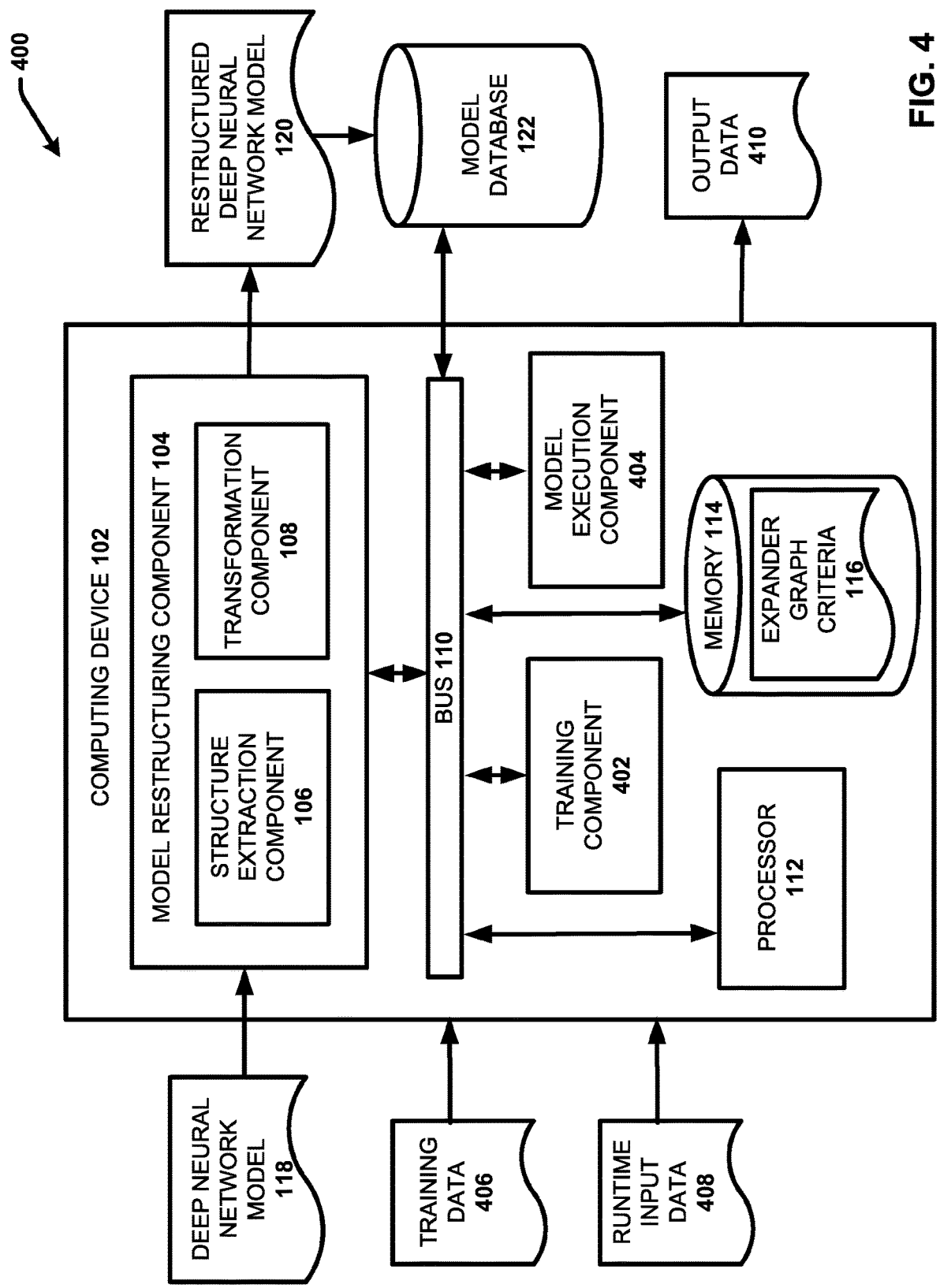
FIG. 4 illustrates a block diagram of an example, non-limiting system that facilitates reducing the processing time and resources associated with executing a deep neural network model in accordance with one or more embodiments of the disclosed subject matter.

FIG. 4 illustrates a block diagram of an example, non-limiting system 400 that facilitates reducing the processing time and resources associated with executing a deep neural network model in accordance with one or more embodiments of the disclosed subject matter. System 400 provides same or similar functionality as system 100 with the addition of training component 402 and model execution component 404 to the computing device 102. Repetitive description of like elements employed in respective embodiments is omitted for sake of brevity.

In accordance with the disclosed subject matter, the model restructuring component 104 can process a pre-trained or partially trained, deep neural network model 118 comprising one or more fully connected layers to transform it into a reconstructed deep neural network model 120. The training component 402 can further train the reconstructed deep neural network model 120 to generate same predictions as the deep neural network model 118 with a same degree of accuracy. In this regard, the training component 402 can apply or reuse the same training data 406 originally employed to train the deep neural network model 118 to train the reconstructed deep neural network model. However, rather than training the entire model to develop new or optimized parameters for all layers or functions of the model, the training component 402 only needs to train the replaced sublayers. In this regard, the training component 402 can use the same parameters/functions developed for the non-fully connected layers of the deep neural network model 118 (e.g., the same parameters for the pooling layers, the convolutional layers, etc.), and apply the training data 406 to determine the parameters for the sparsely connected sublayers. Accordingly, the amount of time required for training the reconstructed deep neural network model 120 will be significantly less than the amount of time required for training the deep neural network model 118. This is because only the parameters for the new, sparsely connected sublayers need to be determined during training, and the number of parameters associated with the sparsely connected sublayers is significantly less than the number of parameters associated with the previous used fully connected layers. Likewise, due to the reduction in model parameters, the amount of time required for continued training and optimization of the reconstructed deep neural network model 120 based on new training data developed over time will be significantly less relative to the amount of time required for continued training and optimization of the deep neural network model 118.

The trained, reconstructed deep neural network model can further be stored in the model database 122, in memory 114 and/or another memory accessible to the computing device 102. As discussed above, due to the significant reduction in the total amount of parameters associated with the reconstructed deep neural network model 120 relative to the deep neural network model 118, the amount of the memory (e.g., memory 114) required for storing the reconstructed deep neural network model 120 relative to the amount of memory required for storing the deep neural network model 118 is significantly less.

The model execution component 404 can further access and apply the trained, reconstructed deep neural network model to (actual) runtime input data 408 to generate the corresponding output data, which can vary depending on the task/prediction that the model is configured to perform. Due to the significant reduction in the total amount of parameters associated with the reconstructed deep neural network model 120 relative to the deep neural network model 118, the amount of the computation/processing time used by the model execution component 404 for executing the reconstructed deep neural network model 120 relative to the amount of time required for executing the deep neural network model 118 is also significantly less, without degradation in the level of accuracy of the output data 410.

Figure 5:
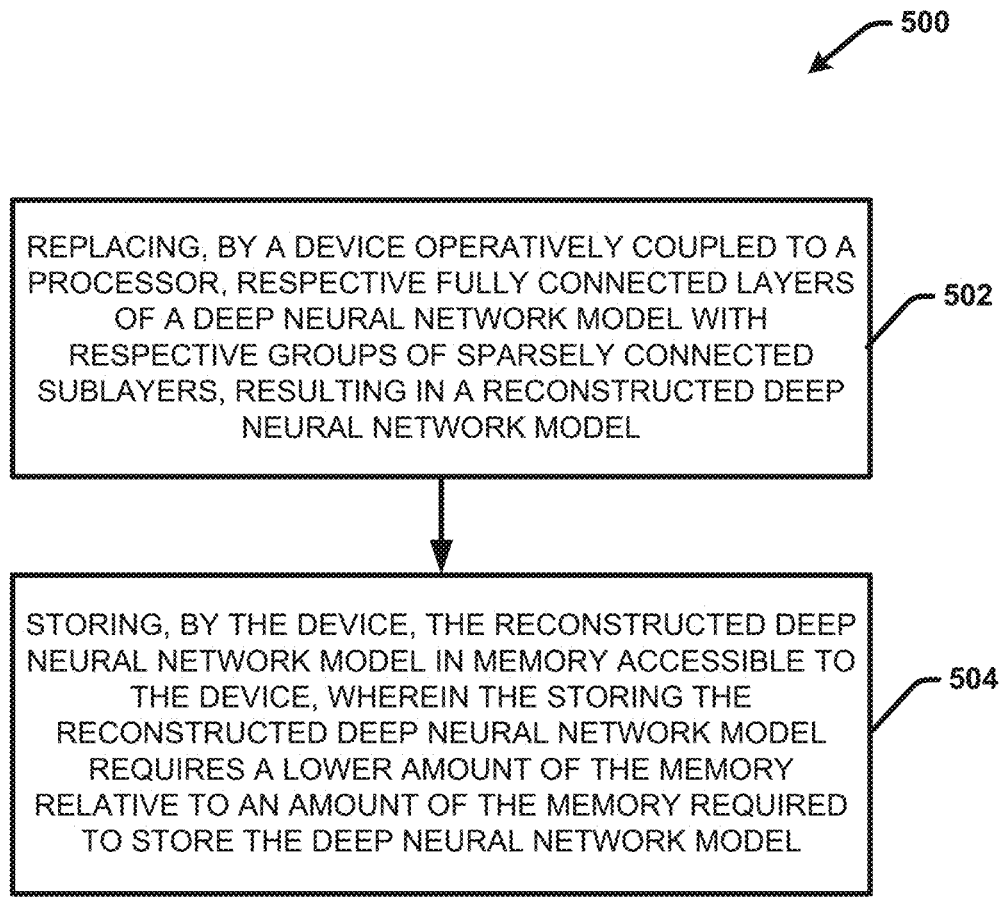
FIG. 5 provides a high-level flow diagram of an example computer-implemented process for reducing an amount of memory used for storing a deep neural network model in accordance with one or more embodiments of the disclosed subject matter.

FIG. 5 provides a high-level flow diagram of an example computer-implemented process 500 for reducing an amount of memory used for storing a deep neural network model in accordance with one or more embodiments of the disclosed subject matter. Repetitive description of like elements employed in respective embodiments is omitted for the sake of brevity.

At 502, a device operatively coupled to a processor (e.g., computing device 102), can replace (e.g., using transformation component 108) respective fully connected layers of a deep neural network model (e.g., deep neural network model 118) with respective groups of sparsely interconnected sublayers, resulting in a reconstructed deep neural network model (e.g., reconstructed deep neural network model 120). At 504, the device can store the reconstructed deep neural network in memory accessible to the device (e.g., in model database 122, in memory 114, etc.), wherein the storing the reconstructed deep neural network model requires a lower amount of the memory relative to an amount of the memory required to store the deep neural network model.

Figure 6:
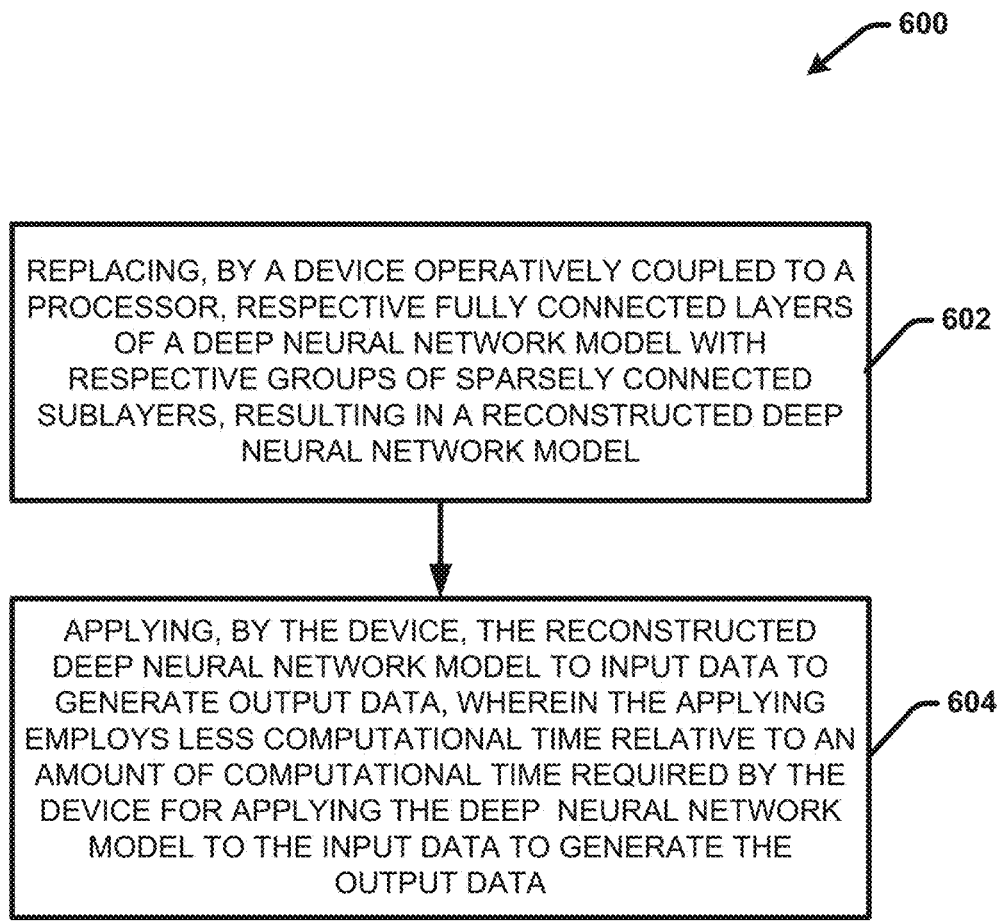
FIG. 6 provides a high-level flow diagram of an example computer-implemented process for reducing the processing time associated with executing a deep neural network model in accordance with one or more embodiments of the disclosed subject matter.

FIG. 6 provides a high-level flow diagram of an example computer-implemented process 600 for reducing the processing time associated with executing a deep neural network model in accordance with one or more embodiments of the disclosed subject matter. Repetitive description of like elements employed in respective embodiments is omitted for the sake of brevity.

At 602, a device operatively coupled to a processor (e.g., computing device 102), can replace respective (e.g., using transformation component 108) fully connected layers of a deep neural network model (e.g., deep neural network model 118) with respective groups of sparsely interconnected sublayers, resulting in a reconstructed deep neural network model (e.g., reconstructed deep neural network model 120). At 604, the device can apply (e.g., using model execution component 404) the reconstructed deep neural network model to input data (e.g., runtime input data 408) to generate output data (e.g., output data 410), wherein the applying employs less computational time relative to an amount of computational time required by the device for applying the deep neural network model to the input data to generate the output data.

Figure 7:
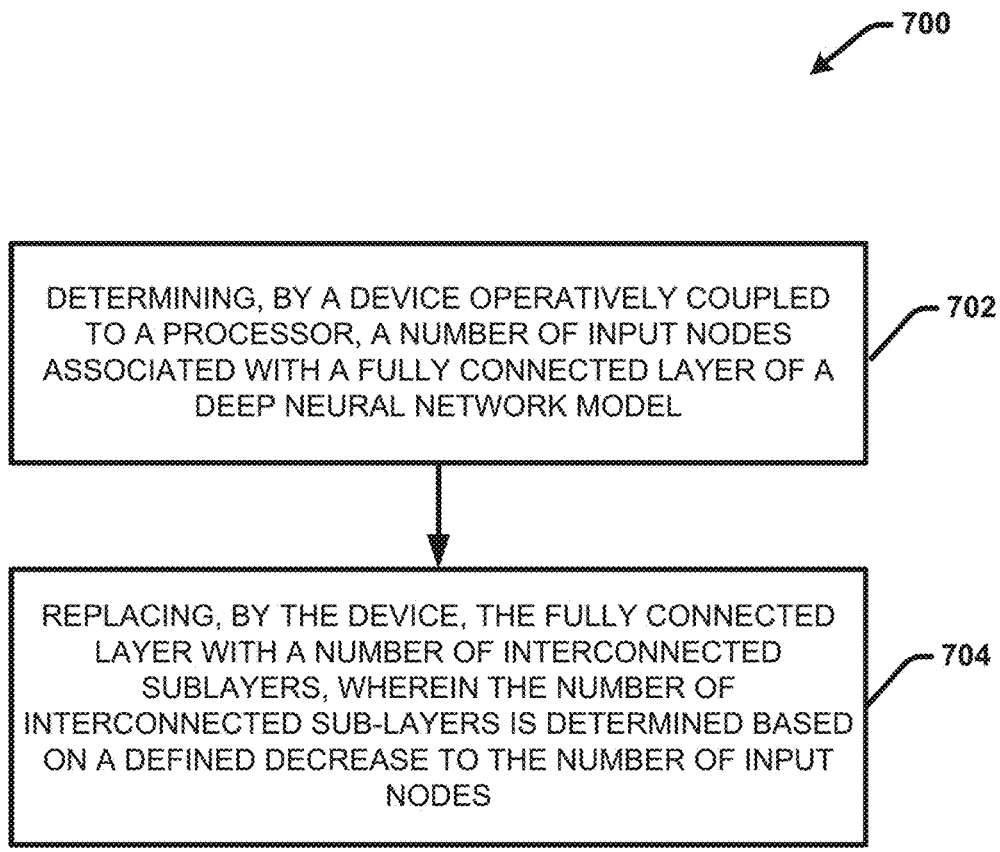
FIG. 7 provides a high-level flow diagram of an example computer-implemented process for reducing the number of parameters of a deep neural network model in accordance with one or more embodiments of the disclosed subject matter.

FIG. 7 provides a high-level flow diagram of an example computer-implemented process 700 for reducing the number of parameters of a deep neural network model in accordance with one or more embodiments of the disclosed subject matter. Repetitive description of like elements employed in respective embodiments is omitted for the sake of brevity.

At 702 a device operatively coupled to a processor, (e.g., computing device 102), can determine (e.g., using structure extraction component 106) a number of input nodes associated with a fully connected layer of a deep neural network model (e.g., deep neural network model 118). At 704, the device can replace (e.g., using transformation component 108) the fully connected layer with a number of interconnected sublayers, wherein the number of interconnected sublayers is determined (e.g., by the transformation component 108) based on a defined decrease to the number of input nodes.

Figure 8:
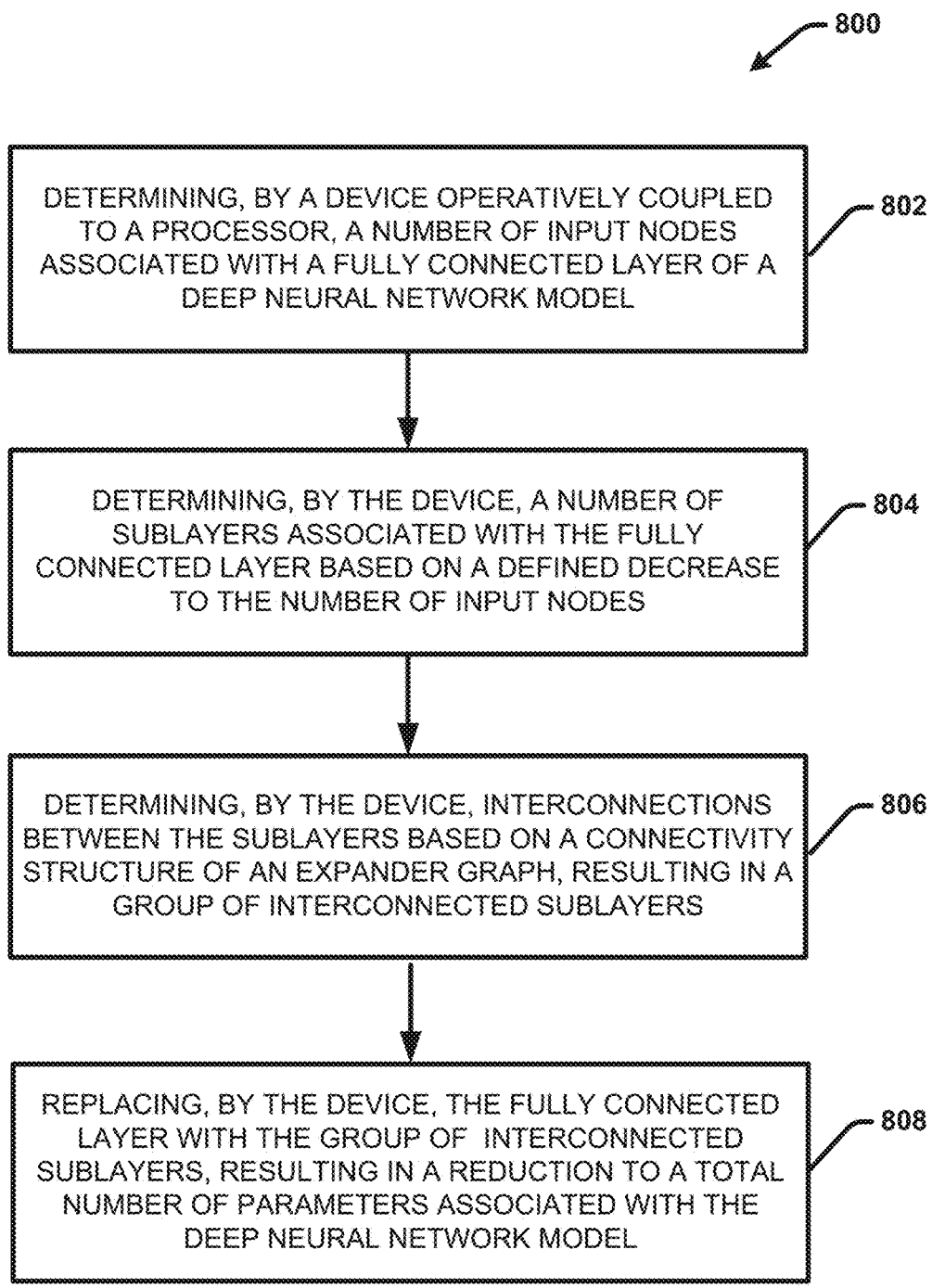
FIG. 8 provides a high-level flow diagram of another example computer-implemented process for reducing the number of parameters of a deep neural network model in accordance with one or more embodiments of the disclosed subject matter.

FIG. 8 provides a high-level flow diagram of another example computer- implemented process 800 for reducing the number of parameters of a deep neural network model in accordance with one or more embodiments of the disclosed subject matter. Repetitive description of like elements employed in respective embodiments is omitted for the sake of brevity.

At 802 a device operatively coupled to a processor, (e.g., computing device 102), can determine (e.g., using structure extraction component 106) a number of input nodes associated with a fully connected layer of a deep neural network model (e.g., deep neural network model 118). At 804, the device determines (e.g., using the transformation component 108) a number of sublayers associated with the fully connected layer based on a defined decrease to the number of input nodes. At 806, the device determines (e.g., using the transformation component 108) interconnections between the sublayers based on a connectivity structure of an expander graph, resulting in a group of interconnected sublayers. At 808, the device replaces (e.g., using transformation component 108) the fully connected layer with the group of interconnected sublayers, (e.g., by the transformation component 108), resulting in a reduction of a total number of parameters associated with the deep neural network model.

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
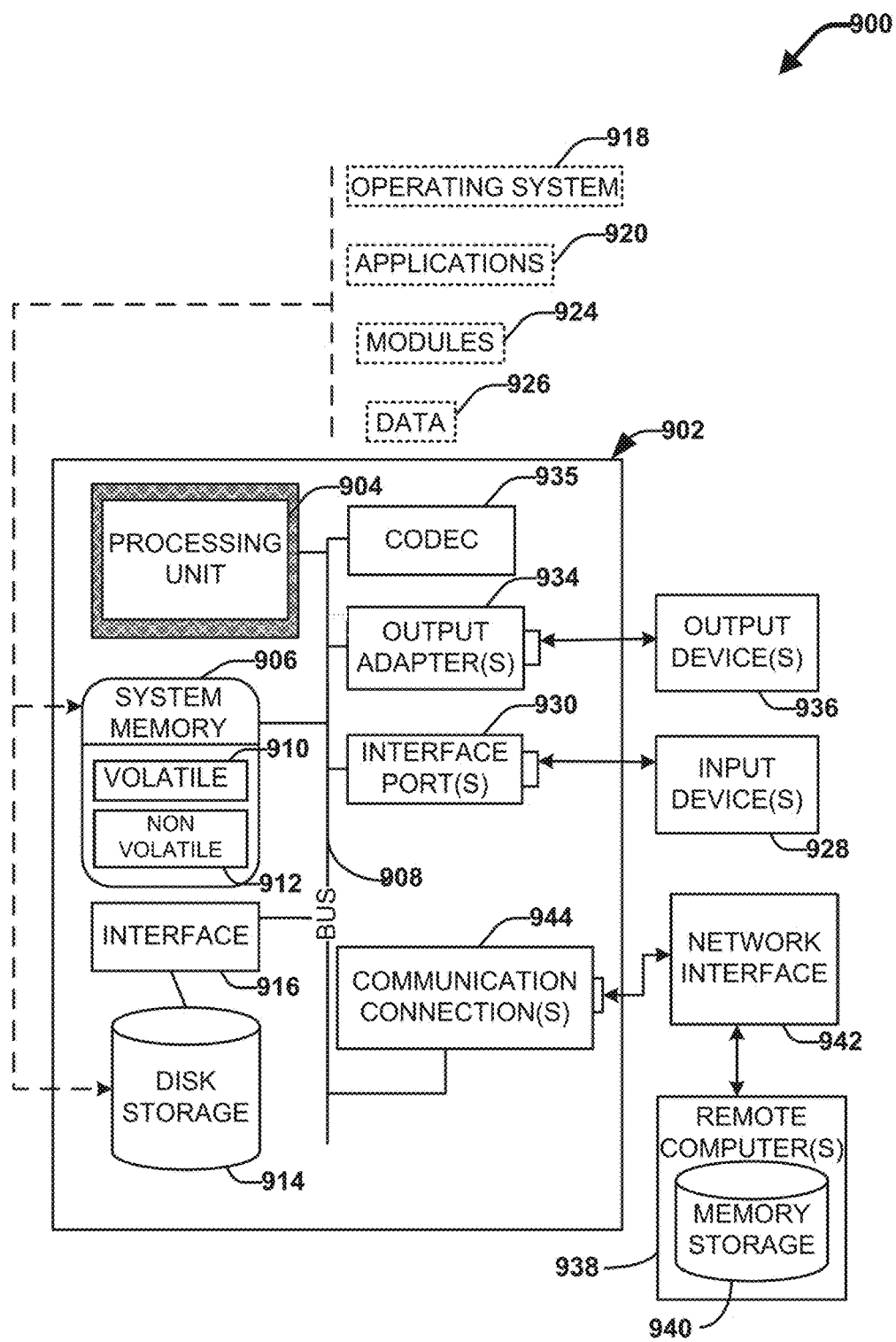
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include one or more removable/non-removable, volatile/non-volatile computer storage mediums. FIG. 9 illustrates, for example, disk storage 914. Disk storage 914 includes, but is not limited to, devices like a magnetic disk drive, solid state disk (SSD), flash memory card, or memory stick. In addition, disk storage 914 can include a storage medium separately or in combination with other storage mediums including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 914 to the system bus 908, a removable or non-removable interface is typically used, such as interface 916. It is appreciated that disk storage 914 can store information related to an entity. Such information might be stored at or provided to a server or to an application running on an entity device. In one embodiment, the entity can be notified (e.g., by way of output device(s) 936) of the types of information that are stored to disk storage 914 or transmitted to the server or application. The entity can be provided the opportunity to opt-in or opt-out of having such information collected or shared with the server or application (e.g., by way of input from input device(s) 928).

It is to be appreciated that FIG. 9 describes software that acts as an intermediary between entities and the basic computer resources described in the suitable operating environment 900. Such software includes an operating system 918. Operating system 918, which can be stored on disk storage 914, acts to control and allocate resources of the computer 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

An entity enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wired or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the system bus 908. While communication connection 944 is shown for illustrative clarity inside computer 902, it can also be external to computer 902. The hardware/software necessary for connection to the network interface 942 includes, for exemplary purposes only, internal and external technologies such as: modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above includes mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable instructions;
    a processor that executes the computer instructions stored in the memory, wherein the computer executable computer instructions:
        determine a number of input nodes of an input layer associated with a fully connected layer of a deep neural network model, wherein the deep neural network model comprises the input layer, an output layer, and at least one fully connected layer between the input layer and the output layer, and wherein the at least one fully connected layer comprises the fully connected layer; and
        replace the fully connected layer with a plurality of sparsely connected sublayers, wherein the sparsely connected sublayers have fewer connections than the fully connected layer, wherein a quantity of the plurality of sparsely connected sublayers is determined based on a defined decrease to the number of input nodes, wherein the plurality of sparsely connected sublayers comprise nodes that are copies of nodes of the fully connected layer, wherein respective sparsely connected sublayers of the plurality of sparsely connected sublayers are in a sequential order, wherein outputs of a first sparsely connected sublayer of the plurality of sparsely connected sublayers in the sequential order are employed as inputs to a second sparsely connected sublayer of the plurality of sparsely connected sublayers in the sequential order, and wherein a first total number of connections amongst the nodes of the plurality of sparsely connected sublayers is less than a second total of number of connections between the nodes of the fully connected layer and layers immediately upstream and downstream from the fully connected layer in the deep neural network model.

2. The system of claim 1, wherein the defined decrease is based on a logarithm of the number of input nodes.

3. The system of claim 1, wherein the fewer connections between the plurality of sparsely connected sublayers are determined based on an expander graph.

4. The system of claim 3, wherein respective input nodes connected to the sparsely connected sublayers are connected with a defined number of output nodes of the output layer.

5. The system of claim 4, wherein the defined number of output nodes is greater than or equal to four.

6. The system of claim 4, wherein the defined number of output nodes is independent of the number of input nodes and a number of output nodes of the fully connected layer.

7. The system of claim 1, wherein a first total number of parameters associated with the plurality of sparsely connected sublayers is less than a second total number of parameters associated with the fully connected layer.

8. The system of claim 7, wherein the total number of parameters associated with the fully connected layer is a product of the number of input nodes and a number of output nodes of the fully connected layer.

9. The system of claim 1, wherein a first total processing time associated with executing the plurality of sparsely connected sublayers is less than a second processing time associated with executing the fully connected layer.

10. The system of claim 1, wherein based on replacement of the fully connected layer with the plurality of sparsely connected sublayers, an amount of memory storage associated with storing the deep neural network model is reduced.

11. A computer implemented method, comprising:
    determining, by a device operatively coupled to a processor, a number of input nodes of an input layer associated with a fully connected layer of a deep neural network model, wherein the deep neural network model comprises the input layer, an output layer, and at least one fully connected layer between the input layer and the output layer, and wherein the at least one fully connected layer comprises the fully connected layer; and
    replacing, by the device, the fully connected layer with a plurality of interconnected sublayers, wherein a quantity of the interconnected sublayers is determined based on a defined decrease to the number of input nodes, and wherein the plurality of interconnected sublayers comprise nodes that are copies of a nodes of the fully connected layer, wherein respective interconnected sublayers of the plurality of interconnected sublayers are in a sequential order, wherein outputs of a first interconnected sublayer of the plurality of interconnected sublayers in the sequential order are employed as inputs to a second interconnected sublayer of the plurality of interconnected sublayers in the sequential order, and wherein a first total number of connections amongst the nodes of the plurality of interconnected sublayers is less than a second total of number of connections between the nodes of the fully connected layer and layers immediately upstream and downstream from the fully connected layer in the deep neural network model.

12. The method of claim 11, wherein the defined decrease is based on a logarithm of the number of input nodes.

13. The method of claim 11, further comprising:
determining, by the device, connectivity between the plurality of interconnected sublayers based on an expander graph.

14. The method of claim 13, wherein the expander graph connects respective input nodes of the plurality of interconnected sublayers with a fixed number of output nodes of the output layer.

15. The method of claim 11, wherein based on the replacing the fully connected layer with the quantity of the plurality of interconnected sublayers, a total number of parameters associated with the deep neural network is reduced.

16. The method of claim 11, wherein a first total processing time associated with executing the plurality of interconnected sublayers is less than a second total processing time associated with executing the fully connected layer.

17. The method of claim 11, wherein based on the replacing the fully connected layer with the quantity of the plurality of interconnected sublayers, an amount of memory storage associated with storing the deep neural network model is reduced.

18. A computer program product for reducing a number of parameters of a deep neural network model, the computer program product comprising a computer readable storage medium having program instructions embodied therewith, the program instructions executable by a processing component to cause the processing component to:
determine a number of input nodes of an input layer respectively associated with fully connected layers of a deep neural network model, wherein the deep neural network model comprises the input layer, an output layer, and the fully connected layers between the input layer and the output layer; and
replace the fully connected layers with respective groups of sparsely connected sublayers, wherein a group of the respective groups of the sparsely connected sublayers has fewer connections than a fully connected layer the group replaces, wherein a quantity of the sparsely connected sublayers included in the group is determined based on a defined decrease to the number of input nodes, wherein the sparsely connected sublayers in the group comprise nodes that are copies of nodes of the fully connected layer, wherein respective sparsely connected sublayers of the plurality of sparsely connected sublayers are in a sequential order, wherein outputs of a first sparsely connected sublayer of the plurality of sparsely connected sublayers in the sequential order are employed as inputs to a second sparsely connected sublayer of the plurality of sparsely connected sublayers in the sequential order, and wherein a first total number of connections amongst the nodes of the plurality of sparsely connected sublayers is less than a second total of number of connections between the nodes of the fully connected layer and layers immediately upstream and downstream from the fully connected layer in the deep neural network model.

19. The computer program product of claim 18, wherein the program instructions further cause the processing component to:
determine the fewer connections between the group of the sparsely connected sublayers based on an expander graph.

20. The computer program product of claim 18, wherein based on replacement of the fully connected layers with the respective groups of the sparsely connected sublayers, a total number of parameters associated with the deep neural network model is reduced.

* * * * *